April 16, 1935. L. ROTHHOLZ 1,998,253

SAFETY POISON BOTTLE AND STOPPER

Filed April 7, 1934

INVENTOR
Louis Rothholz
BY
ATTORNEY

Patented Apr. 16, 1935

1,998,253

UNITED STATES PATENT OFFICE 1,998,253

SAFETY POISON BOTTLE AND STOPPER

Louis Rothholz, New York, N. Y.

Application April 7, 1934, Serial No. 719,497

2 Claims. (Cl. 215—98)

This invention relates to new and useful improvements in safety poison bottle and stopper.

The invention has for an object the construction of a bottle and stopper arranged in a manner so that the stopper once inserted into the neck of the bottle cannot be removed with the fingers but requires a tool for its removal and thus eliminates the possibility of mistaking the poison bottle for some other bottle in the dark, or night or other place.

Furthermore, it is contemplated to so arrange the stopper in the neck of the bottle to eliminate the possibility of the stopper becoming loose so that the contents of the bottle, especially if strong alcoholic such as colognes of expensive grades, will not evaporate.

Still further the invention particularly proposes an arrangement of a poison bottle with a neck having a base portion adapted to receive a stopper for frictionally holding the stopper and having a top outwardly flared continuation from preventing the fingers from gripping the stopper and of a slope too steep for frictionally holding a stopper. Thus it is necessary that the stopper be inserted from the base portion and thereafter cannot be readily removed.

Still further, the invention also proposes the arrangement of an element upon a stopper adapted to be gripped with a tool for its extraction from the bottle.

Still further, the invention also proposes an arrangement wherein the stopper is of an inconventional shape so as to eliminate the possibility of conventional stoppers being used in the safety bottle instead.

Another one of the objects of this invention is the arrangement of coacting means upon the stopper and the inner wall of the neck of the bottle for latching the stopper in position and necessitating a turning tool and a twisting motion to release the stopper from its latched condition.

Still further the invention proposes the construction of an article as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing, forming a material part of this disclosure:—

Figure 3:
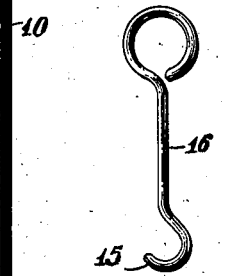
Fig. 3 is a side elevational view of a tool useable to extract the stopper.

The safety poison bottle and stopper according to this invention comprises a poison bottle 10 having a neck with a base portion 11 adapted to receive the stopper 12 for frictionally holding the stopper in position and having a top outwardly flared continuation 13 for preventing one's fingers from gripping the stopper to extract it and of a slope too steep for frictionally holding a stopper. The stopper 12 is provided with an element 14 in its top adapted to be gripped by a tool for the extraction of the stopper from the bottle. This element 14 is an eye element and is adapted to be engaged by the hook portion 15 of a tool 16 as illustrated in Fig. 3.

It is a feature of this invention that the slopes of the base portion and the upper portion of the neck of the bottle are for the following purposes: (1) that the base portion be adapted to receive and frictionally hold a stopper, (2) that the upper portion be of a slope so as to be incapable of holding a stopper, and (3) that the upper portion to be so arranged to prevent one's fingers from gripping the stopper for its removal. It should be understood that if a large stopper is obtained and engaged into the upper portion of the outwardly flared continuation 13 it will not maintain its position because of the large angle of the sloping sides.

Figure 5:
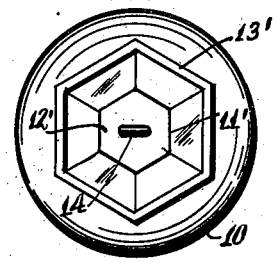
Fig. 5 is a plan view of Fig. 4.
Figure 4:
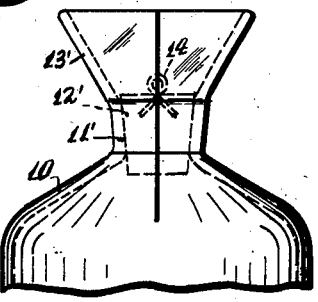
Fig. 4 is a fragmentary side elevational view similar to a portion of Fig. 1 illustrating another embodiment of the invention.

In Figs. 4 and 5 another embodiment of the invention has been disclosed wherein the neck of the bottle is of a peculiar shape necessitating a similarly shaped stopper and so eliminating any possibility of a foreign stopper being used in the bottle. More particularly the neck portion of the bottle is shown provided with a base portion 11' and a top outwardly flared continuation 13', both hexagonal in horizontal cross section. The base portion 11' is tapered to a small degree so as to be capable of frictionally holding the stopper 12' engaged in the neck of the bottle. The outwardly flared continuation 13' is so arranged as to prevent one's fingers from gripping the stopper and furthermore is of a slope so as to be incapable of frictionally holding a stopper inserted therein. The stopper 12' is provided with a gripping element 14 similar to that previously described. With this arrangement it is necessary that the particular stopper 12' or a similarly shaped stopper be used in the neck of the bottle and substitution of a conventional stopper be made impossible.

Figure 1:
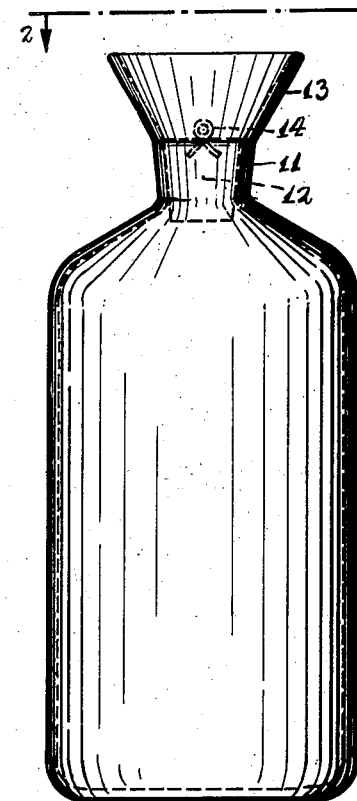
Fig. 1 is a side elevational view of a safety poison bottle and stopper according to this invention.
Figure 2:
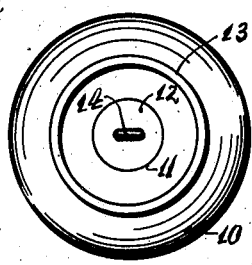
Fig. 2 is a plan view of Fig. 1 as though looking in the direction of the line 2—2 of Fig. 1.
Figure 8:
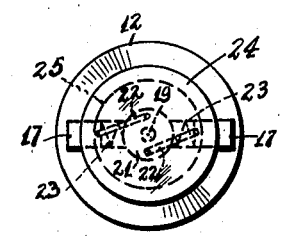
Fig. 8 is a bottom elevational view of the stopper per se.
Figure 6:
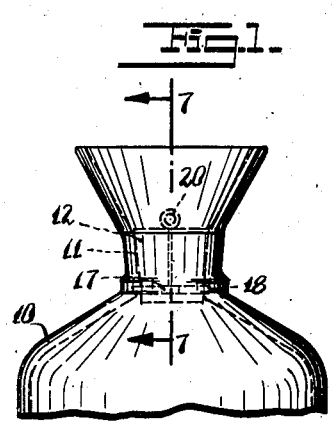
Fig. 6 is another fragmentary side elevational view similar to a portion of Fig. 1 but illustrating a still further modification of the invention.
Figure 7:
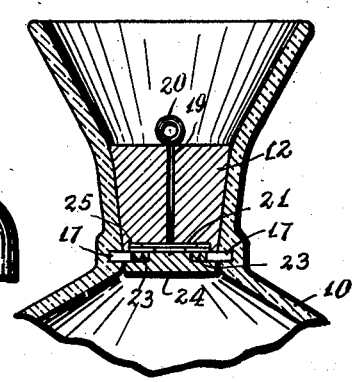
Fig. 7 is a sectional view taken on the line 7—7 of Fig. 6.

In Figs. 6–8 inclusive another embodiment of the invention has been disclosed wherein there is an arrangement for actually holding the stopper against removal except if removed in a particular fashion. More specifically the neck of the bottle is shaped similar to that described in Figs. 1 and 2, the same parts may be recognized by the corresponding reference numerals, and the stopper 12 carries resiliently extended keepers 17 automatically engageable in an internal peripheral groove 18 in the base portion of the neck of the bottle. A stem 19 extends from the top of the stopper and is formed with an eye opening 20 for a tool such as illustrated in Fig. 3.

A means for retracting the resiliently extended keepers 17 is associated with the keepers and with the stem in a manner so that the keepers are retracted upon slight turning of the stem 19. The arrangement comprises a disc 21 fixed upon the lower end of the stem 19. A pair of opposed arms 22 are eccentrically pivotally mounted upon the disc and extend in opposite directions and have their outer ends respectively pivotally connected with the inner ends of the keepers 17. The keepers 17 are urged into extended positions by springs 23 acting between their inner ends and a portion of the stopper.

The stopper 12 is constructed of two pieces cemented or amalgamated or in any other manner held together. More particularly the stopper comprises an upper piece and a lower piece 24 of disc shape constituting the lower or bottom end of the stopper. This lower piece 24 is cemented to the bottom of the upper portion except at certain areas where the keepers 17 project. The lower portion 24 is formed with cavities from which the keepers 17 project and in which the springs 23 are disposed. The arms 22 and the disc 21 are arranged in a cavity 25 formed in the lower portion of the upper portion of the stopper. This cavity 25 is circular in shape as clearly illustrated in Fig. 8, but obviously is not seen from the exterior because of the lower portion 24 of the stopper.

With the arrangement illustrated in Figs. 6–8 inclusive the stopper may be pressed in the neck of the bottle as any other stopper into its closed position. During the motion of the stopper to its closed position the resiliently extended keepers 17 will be depressed by the slopping sides of the neck of the bottle. After the stopper has reached its fully closed position the keepers 17 will be urged outwards into the groove 18. The stopper cannot now be removed except if a proper tool is engaged upon the eye opening 20, and the stem 19 rotated through substantially 90° so as to cause the arms 22 to draw the keepers 17 inwards to disengage the keepers from the groove 18. Then with a longitudinal outward motion the stopper can be withdrawn.

It is to be understood that the stopper may be made of any suitable material such as rubber, cork, composition, etc., and that its size and shape may be varied.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A safety poison bottle and stopper, comprising a poison bottle having a neck with a base portion adapted to receive a stopper for frictionally holding the stopper and having a top outwardly flared continuation for preventing one's fingers from gripping said stopper, and of a slope too steep for frictionally holding a stopper, and a stopper for said bottle having resiliently extended keepers automatically engageable in an internal groove in the base portion of said neck, a rotatable stem extending from the top of said stopper for engagement with a tool, and means for retracting said keepers from rotation of said stem comprising an element fixed on the lower end of the stem, and eccentric rods pivotally connected with the element and with the keepers.

2. A safety poison bottle and stopper, comprising a poison bottle having a neck with a base portion adapted to receive a stopper for frictionally holding the stopper and having a top outwardly flared continuation for preventing one's fingers from gripping said stopper and of a slope too steep for frictionally holding a stopper, and a stopper for said bottle having resiliently extended keepers automatically engageable in an internal groove in the base portion of said neck, a rotatable stem extending from the top of said stopper for engagement with a tool, and means for retracting said keepers from rotation of said stem, comprising a disc fixed upon the lower end of the stem, eccentric rods pivotally connected with the disc and with said keepers.

LOUIS ROTHHOLZ.